March 31, 1970 R. S. GLUSKIN 3,503,607
PNEUMATIC DOCUMENT STACKING DEVICE
Filed Dec. 27, 1967

3,503,607
PNEUMATIC DOCUMENT STACKING DEVICE
Richard S. Gluskin, Wayne, Pa., assignor to Sperry Rand Corporation, New York, N.Y., a corporation of Delaware
Filed Dec. 27, 1967, Ser. No. 693,920
Int. Cl. B65h 29/24
U.S. Cl. 271—63            6 Claims

ABSTRACT OF THE DISCLOSURE

A pneumatic stacker mechanism is disclosed for a document feeder. Documents transported down the document feeder path encounter a series of reverse direction fluid jets located aft the exit point of the feeder mechanism. The reverse direction jets arrest the document motion and start the document back toward the feeder exit point. A document deflection jet means associated with the reverse direction jets deflects the document downwardly toward a stacker receptacle and the reverse direction jets together with the deflection jet means then act on the document to quickly force the document into the stacker receptacle. A fluid jet curtain located above the stacker receptacle acts to assist the reverse direction jets in guiding the document into the stacker receptacle.

---

This invention relates in general to a document handling mechanism and in more particular to a pneumatically controlled document stacker mechanism.

In the document handling field it is quite important particularly in those situations where the same documents are repeatedly processed to handle the documents carefully to avoid damage thereto. Mechanical handlers using rollers, belts, etc. have a tendency due to the mechanical gripping of the document to damage the document by the gripping action of the belts or rollers themselves. Also, handlers of the above type are not simple in design since they involve many moving parts, are subject to wear and are thus unreliable and expensive to manufacture.

It is therefore an object of this invention to provide a stacker mechanism which is simple in design and reliable in operation.

It is another object of this invention to provide a stacker mechanism which is inexpensive to fabricate and which will pneumatically stack the documents without their contacting any mechanical surfaces en route to the stacker receptacle.

It is still another object of the invention to provide a novel pneumatic stacker mechanism for a document handler.

BRIEF SUMMARY OF INVENTION

Briefly, the present invention comprises a novel pneumatically controlled stacker mechanism located at the exit point of a document feeder path. The stacker mechanism comprises a group of reverse-direction jets which are located along the document path at the exit point of the feeder mechanism. The reverse direction jets are located in a plate mounted above the document path and operate after the document has left the feeder to arrest the motion of the document and to start the document back toward the feeder exit point. Due to the Bernoulli effect of the reverse direction jets, the document initially is drawn close to the surface of the plate in its motion back toward the exit point of the document feeder mechanism. A deflection jet means which may comprise one or more jet ports located near the exit point of the feeder are angled in a forward direction relative to the path of the document and operate to push the document toward the reverse-direction jets during its exit from the feeder mechanism. Then when the document starts its reverse motion back toward the feeder mechanism, the deflection jet means operates to push the trailing edge of the document downwardly from the plate to start it in its downward descent to a stacker receptacle. When this occurs the reverse direction jets continue to exert a pushing force on the upper surface of the document in a direction which guides the document into the stacker. Above the stacker at a point near the back half thereof is a fluid curtain with which the document collides. This curtain acting on the trailing edge of the document assists the reverse-direction jets in quickly guiding the document into the stacker.

Figure 1:
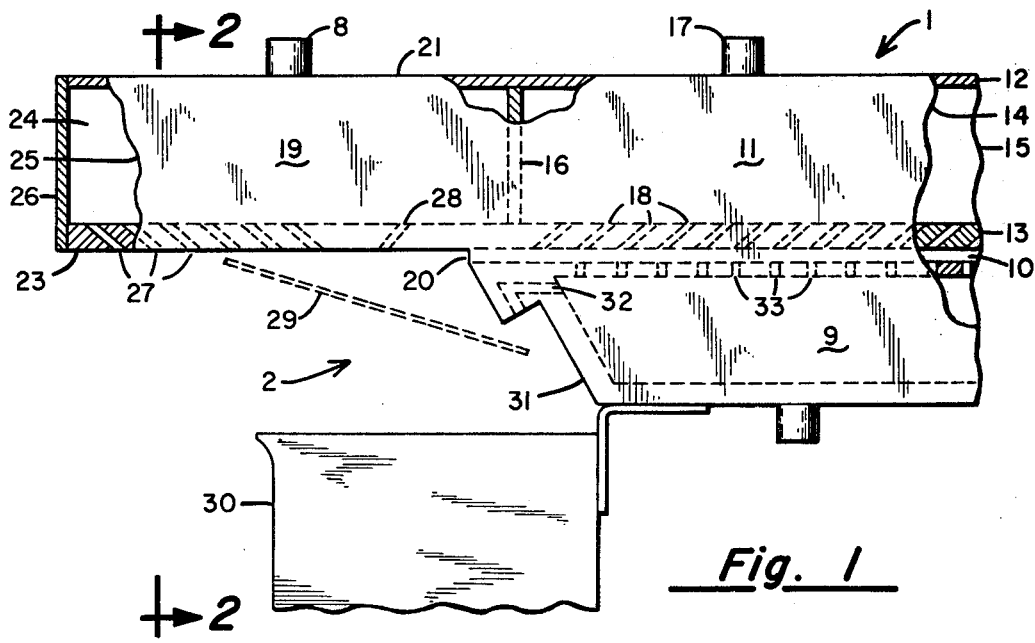
Figure 2:
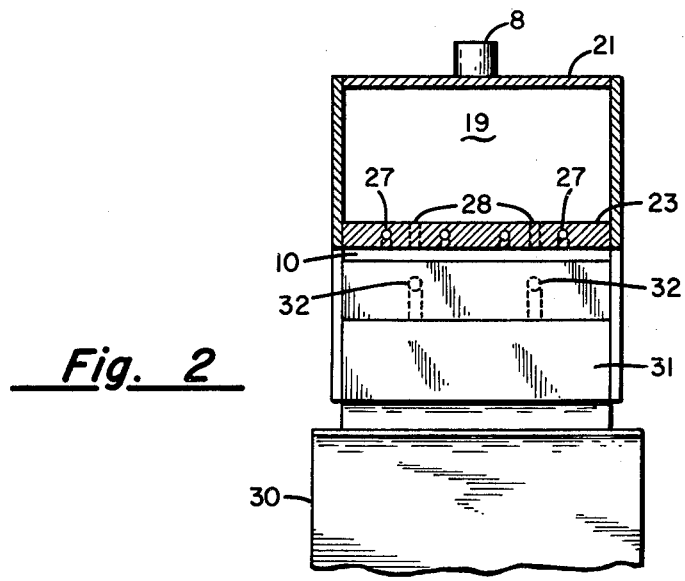

FIGURE 1 in the drawings shows schematically, in a side elevational view, one typical embodiment of the invention, wherein the document feeder mechanism itself is only fragmentarily illustrated; and FIGURE 2 is a sectional view of FIGURE 1 taken along lines 2—2 thereof.

Referring now to the drawings, there is shown generally at 1 in FIGURE 1 a fragmentary view of a card feeder system which feeds documents into the novel stacker shown generally at 2 comprising applicant's invention. In this view documents are assumed moving at a high rate of speed from right to left down the document guide channel 10 of the feeder mechanism 1. In a typical construction the documents are moved along the guide channel 10 pneumatically as described, for example, in my copending application Ser. No. 646,556, filed June 16, 1967, now U.S. Patent 3,437,335. For this purpose a first air chamber 11 is provided which comprises a top plate 12, a bottom plate 13, a pair of side plates 14 and 15 and a pair of end plates, one of which is shown in dotted form at 16. These plates, all of which may be made of a suitable fluid-impervious plastic material, are bolted or cemented together to form the chamber 11. A suitable air pressure fitting 17 located in the top plate, for example, is provided through which a source of air pressure may be connected. Air under pressure existing in chamber 11 is then forced to exit out through a plurality of longitudinally arranged rows of ports located in the bottom plate 13 of the chamber 11. One such row is shown in dotted form at 18 and in practice 3 or 4 such rows arranged transversely of the card guide channel 10 may be included. The ports 18 which may be holes drilled in the plate 13 at an angle of 30° to 45° relative to the horizontal operate to propel the document along the length of the guide channel 10 at a high rate of speed.

The bottom surface of the document guide channel 10 may be partially formed by the top plate of a second air pressure chamber indicated at 9. The vertical holes 33 in the top plate of chamber 9 provide an air cushion upon which the document may ride while being driven along the channel 10 by air exiting from ports 18. In a typical embodiment the depth of channel 10 is somewhat deeper than the thickness of the document propelled therealong. Similarly, the transverse dimension of channel 10 is somewhat wider than the width or the length of the document to be propelled therealong in dependency upon whether an end or an edge feed is preferred for the document. Documents in channel 10 are propelled in a right-to-left direction and exit from the card channel 10 at a point 20 along its length. Located at the exit end 20 of the channel 10 and overhanging this channel is a third air chamber designated 19 which can also be made of plastic material. The air chamber 19 like air chambers 11 and 9 comprises a top plate 21 which contains an air input fitting 8, a bottom plate 23, side plates 24 and 25 and end plates 26 and 16.

Formed in the bottom plate 23 of air chamber 19 are a plurality of reverse acting fluid jet ports which are arranged so that a document exiting at high speed from channel 10 at point 20 will encounter the reverse jets and will be stopped thereby at a point downstream from the exit point 20 of the feed channel 10. In a typical example, four longitudinal rows one of which is shown at 27 arranged transversely of the card path comprise the reverse or stopping jets. The reverse jet ports 27 are formed in the bottom plate 23 of chamber 19 by drilling holes at an angle of say 30° to the horizontal. These ports which may be of various sizes and spacings are energized from chamber 19 and the air source connected to fitting 8 so as to stop the document after it has left the exit 20 of guide channel 10. Due to the Bernoulli effect the reverse jets 27 also act to cause the document to be drawn close to the underside of plate 23 after it has left the guide channel 10. After stopping the document, the reverse jets 27 start to propel the document along the underside of plate 23 back toward the exit point 20 of the document guide channel 10. Disposed in the plate 23 at a point near the exit 20 of the guide channel 10 is a document deflecting jet means shown in dotted form at 28. The deflecting jet means 28 may comprise one or more ports drilled at an angle of 45° and oriented in the reverse direction from the jet ports 27. The deflection jets 28 are positioned so that when the forward motion of the document has been stopped by the reverse jets 27, the trailing edge of the document will be downstream of the deflecting jets 28. Then when the document has its motion reversed, now tending to move from left to right, the deflecting jet 28 will deflect the trailing edge of the document from the bottom surface of the bottom plate 23 of air chamber 19 in a manner shown in dotted form at 29. The deflecting jets 28 thus forces the trailing edge of the document down toward the stacker receptacle 30 and at the same time permits the reverse jets 27 to continue to push the document from left to right rapidly forcing the document down into the stacker receptacle 30. The document in its movement toward the receptacle 30 moves toward the end plate 31 of chamber 9. The end plate 31 of chamber 9 has, for example, a pair of transverse ports shown in dotted form at 32 located therein and arranged to direct a curtain of air downward and toward the back of the stacker receptacle 30. With this arrangement the document, when it is being propelled back down toward the receptacle 30 by the jets 27, will be prevented by the air curtain from jet ports 32 from banging into the end plate 31 and damaging the document. The air curtain exiting from the jets 32 provides a cushion for the trailing edge of the document and at the same time assists the deflection jet 28 in forcibly pushing the document down into the stacker receptacle 30. Thus, through the action of the reversing jets 27, the deflection jets 28 and the air curtain provided by the jets 32 the card is forcibly and quickly driven into the receptacle 30.

In one embodiment constructed of the present invention, cards 4 inches by 2½ inches were utilized. The feed channel 10 was approximately 0.125 inch deep and 2 9/16 inches wide. The pressure in chamber 11 and the action of jets 18 were arranged such that the card was driven down the channel 10 at the rate of 100 inches per second. In the stacker portion four rows of reversing jets 27 were utilized. These jets were each angled at 30° relative to the horizontal; were transversely spaced from one another by ⅝ inch, and uniformly spaced over a distance of 3½ inches along the length of the plate 23. In this same embodiment a pair of deflecting jets 28, both angled at 45°, were utilized. These jets were transversely spaced 1½ inches from one another at a point ½ inch from the exit point 20 of the card guide channel 10. The length of the bottom plate 23 from the exit point 20 to the last port 27 was 6 inches long. The vertical spacing from the underside of plate 23 to the stacker receptacle 30 was 1¼ inches. The angle of the end wall 31 of chamber 9 was approximately 60° to the horizontal.

While only a certain and specific embodiment of the invention has been disclosed herein, other embodiments coming within the spirit of the invention will be apparent to those skilled in the art.

The embodiments of the invention in which an exclusive property or privilege is claimed are defined as follows:

1. In a document handling system which includes a document transport mechanism for moving documents along a path to an exit point; a stacker system comprising, a document receptacle located at one end of the document path at the exit point thereof, and fluid jet means extending from said exit point of the document path and positioned above said document receptacle, said jet means comprising a first fluid jet source angled to arrest the motion of the document and to reverse its direction back toward said exit point; said jet means further comprising a second fluid jet source to deflect the document toward said receptacle upon reversal of its motion.

2. The combination set forth in claim 1 wherein the said fluid jet means further comprises a third fluid jet source located in the path of reverse motion of the document for further guiding the document into said receptacle.

3. The combination set forth in claim 2 wherein the third jet source is located at said exit point above said receptacle.

4. The combination set forth in claim 1 wherein said fluid jet means comprises an air chamber having a wall extending from said exit point downstream of said document path, said wall including a first port means formed therein for arresting the motion of the document and a second port means for deflecting the document.

5. The combination set forth in claim 4 wherein the first port means is located at a first point displaced from the exit point of the document path by a first distance and the second port means is located at a second point closer to the exit point of the feeder mechanism.

6. The combination set forth in claim 4 wherein the first port means comprise a series of holes formed in the said wall at a first angle oriented toward the said exit point and the second port means comprise a plurality of holes formed in the said wall at a second angle oriented away from the said exit point.

References Cited

UNITED STATES PATENTS 3,243,181   3/1966   Lyman _____ 271—74
3,405,977   10/1968   Albright _____ 302—29

RICHARD E. AEGERTER, Primary Examiner

U.S. Cl. X.R.

302—29